Figure 14:
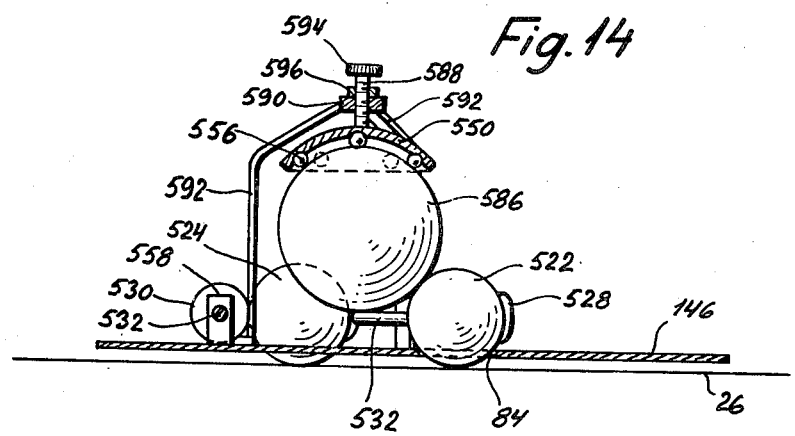

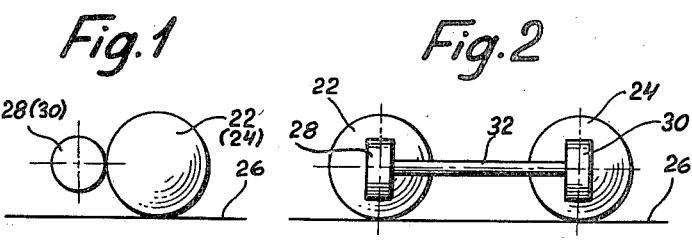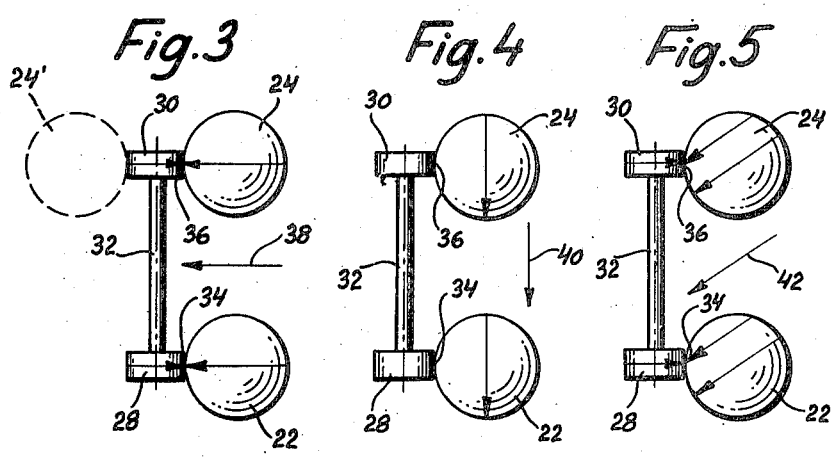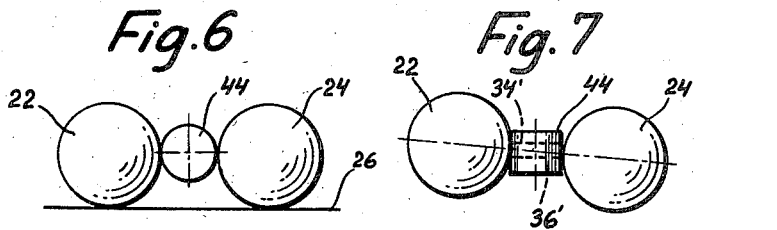

July 30, 1957

S. H. KRISTIANSEN 2,800,720

PARALLEL GUIDING DEVICES

Filed Aug. 30, 1955

INVENTOR:
Svend Helge Kristiansen,
BY

His Agent.

July 30, 1957  S. H. KRISTIANSEN  2,800,720
PARALLEL GUIDING DEVICES
Filed Aug. 30, 1955  5 Sheets-Sheet 3
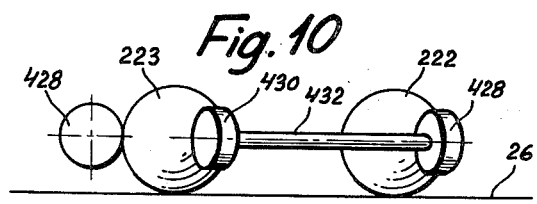
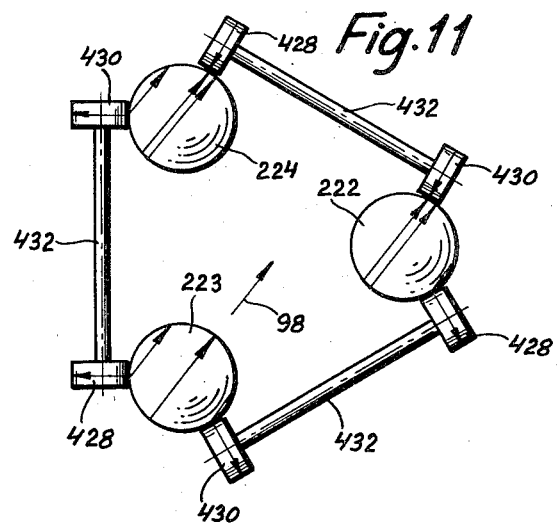
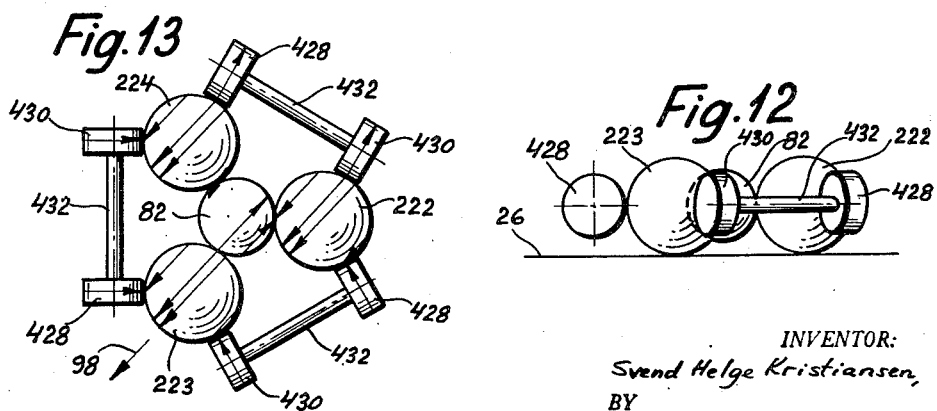
INVENTOR:
Svend Helge Kristiansen,
BY July 30, 1957 S. H. KRISTIANSEN 2,800,720
PARALLEL GUIDING DEVICES
Filed Aug. 30, 1955 5 Sheets-Sheet 5

INVENTOR:
Svend Helge Kristiansen,
BY
His Agent.

United States Patent Office 2,800,720
Patented July 30, 1957

2,800,720
PARALLEL GUIDING DEVICES
Svend Helge Kristiansen, Lille Nestved, Denmark
Application August 30, 1955, Serial No. 531,371
22 Claims. (Cl. 33—109)

This invention relates to a parallel guiding device for ensuring parallel motion in all directions of another device, for instance a drafting machine on a plane surface.

It is known to ensure parallel movements of a drafting machine or other devices by means of a system of linked bars mutually connected in such a way that they form a system of parallelograms, one end of the said system being connected for instance to the edge of a drawing board whereas the other end is connected to the ruler device. However, a drafting machine as the one referred to suffers from the drawback that it is only applicable in connection with the drawing board to which it is fastened.

It is also known to ensure parallel motion of a ruler by means of two rolls fastened on a common shaft and rotatably mounted in bearings on the ruler. Such a parallel guiding mechanism permits, however, parallel movements in one direction only.

An object of the present invention is to provide a parallel guiding device, especially for use in connection with a drawing machine, and which makes it possible, without being attached to a drafting board or another base, to ensure parallel motion in all directions of a drawing machine or another device connected to the parallel guiding mechanism.

Another object of the invention is to provide a parallel guiding device which is simple and which is easy to transport from place to place for instance in a brief-case.

A further object of the invention is to provide a drafting machine, especially suitable for making sketches or minor drawings or for occasional use, the said drafting machine occupying little space only and is therefor easy to put aside, and it may also be used even on small drawing boards which are too small for making it possible to fasten thereon a drawing machine of one of the hitherto known arts, and furthermore it may be used on another surface not constituting a normal drafting board, such as a writing table.

Figure 15:
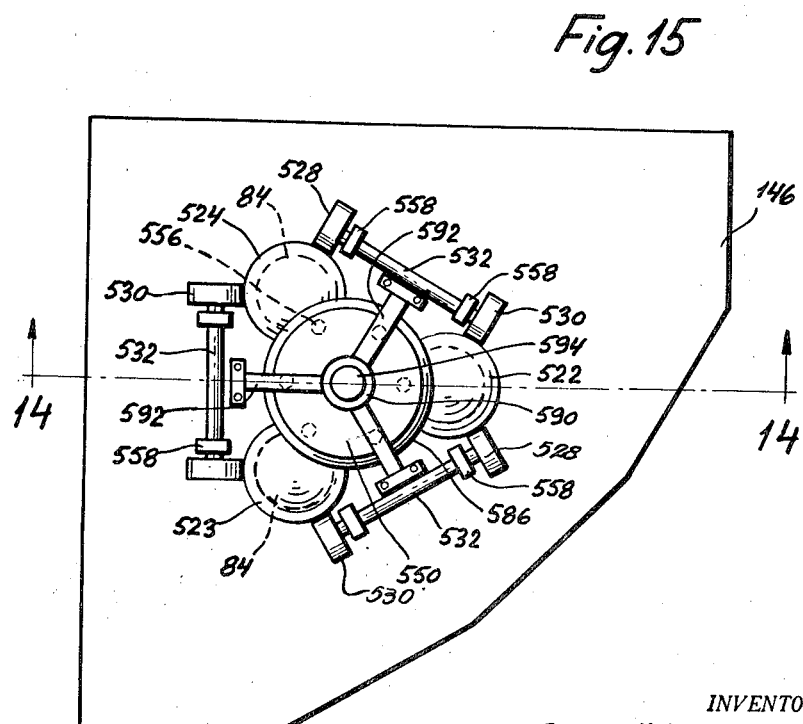
Figure 16:
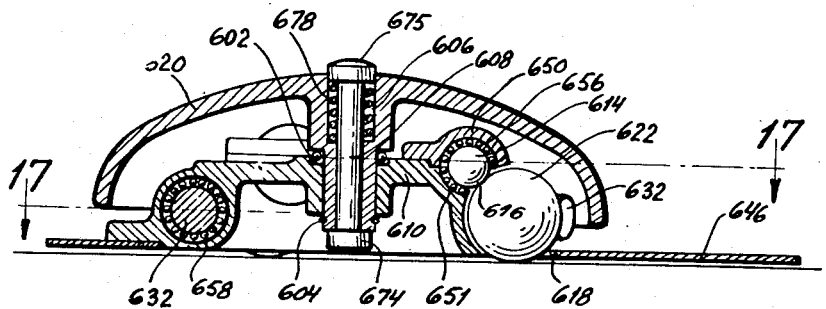
Figure 17:
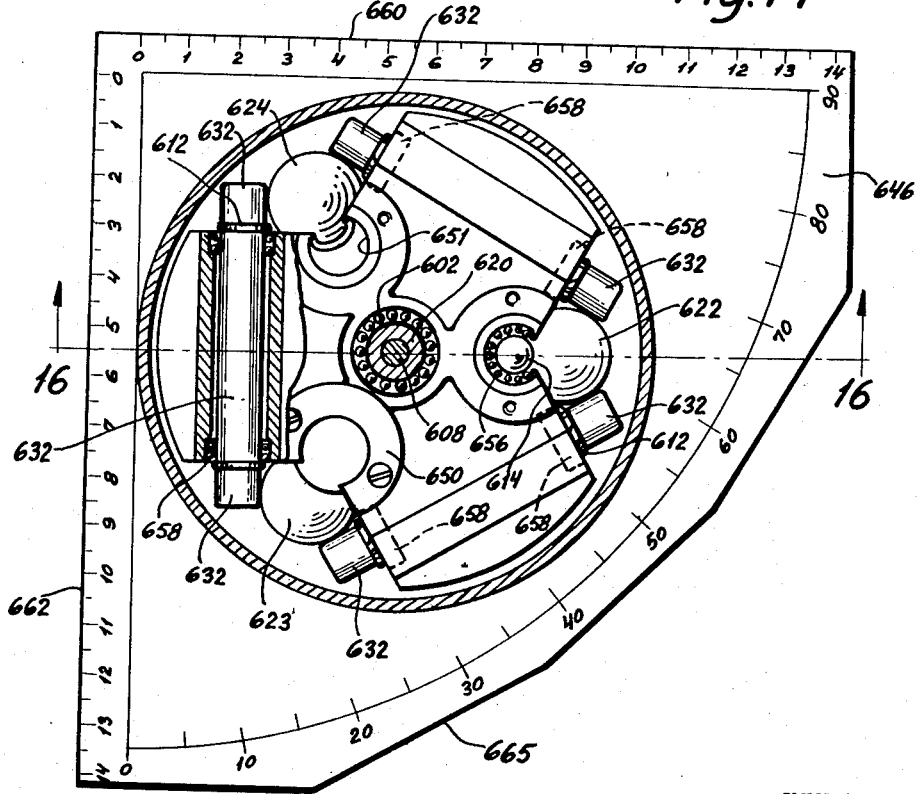

My invention and the principle thereof will be more fully understood and further objects and advantages thereof will become apparent when reference is made to the more detailed description thereof which follows below and to the accompanying drawings, in which Fig. 1 is an end view of a schematically shown embodiment of the invention, Fig. 2 is a side view of the same, Figs. 3 to 5 are plan views of the same device moved in three different directions, Fig. 6 is a side view of another embodiment of the invention, also shown schematically, Fig. 7 is a plan view of the same, Fig. 8 is a side view of a third embodiment of the invention, Fig. 9 is a plan view of the same, Fig. 10 is a side view of a fourth embodiment of the invention, schematically shown, Fig. 11 is a plan view of the same, Fig. 12 is a side view corresponding to that in Fig. 10 of a slightly amended similar device, Fig. 13 is a plan view of the same, Fig. 14 is a vertical sectional view along the line 14—14 in Fig. 15 of a further embodiment of the invention, Fig. 15 is a plan view of the same, Fig. 16 is a vertical sectional view along the line 16—16 in Fig. 17 of a drafting machine embodying still a further modification of the invention, and Fig. 17 is a horizontal sectional view along the line 17—17 in Fig. 16.

In Figs. 1 to 5 are shown two balls 22 and 24, which for the sake of simplicity are of the same diameter and which may roll on a plane 26. 28 and 30 are two equally great rolls which are fastened on a shaft 32 which in a manner not shown are rotataby mounted with their axis of rotation situated at a distance from the plane 26 equal to the radius of the balls 22 and 24.

The rolls 28 and 30 contact the balls, 22 and 24 respectively in the points 34 and 36, see Figs. 3 to 5.

It will be easily seen from Figs. 3 to 5 that a movement of the parallel guiding mechanism about any axis at right angles to the plane 26 can only be brought about provided either that one of the balls glides on the plane or that a movement takes place between one of the balls 22 and 24 and the roll 28 or 30 respectively against which it abuts. This involves the provision that the friction between the plane 26 and the balls 22 and 24 on one hand and between the balls 22 and 24 and the rolls 28 and 30 on the other hand is made so great that the actuations to which the parallel guiding mechanism is normally exposed cannot bring about a sliding movement but only a rolling movement partly between the balls 22 and 24 and the plane 26, and partly between the balls 22 and 24 and the rolls 28 and 30, such that the parallel guiding mechanism will not be able to turn about an axis at right angles to the plane 26.

In Fig. 3 the parallel guiding device is imagined moved in the direction of the arrow 38, namely at right angles to the shaft 32. During this movement the balls 22 and 24 will rotate and at the same time turn the rolls 28 and 30. As the rolls 28 and 30 are equally great and are rigidly connected to the shaft 32, their angular movement will always be the same, and the lines, which the balls bring about by their rolling against the rolls, will be equally great and simultaneously have the same length as the lines which the balls bring about through their rolling against the plane. Consequently there will be a parallel movement of the parallel guiding device in the direction indicated by the arrow 38.

In Fig. 4 the parallel guiding device is thought moved in the direction of the arrow 40, parallel to the shaft 32. During this movement the balls 22 and 24 will rotate about the contact points 34 and 36 between the balls and the rolls. It is easy seen that also by this movement nothing but a parallel movement of the parallel guiding device can be brought about.

Fig. 5 shows the conditions of the motion by a movement of the parallel guiding device in the direction of the arrow 42 forming an arbitrary angle to the axis of the shaft 32. By this movement will be brought about partly a rolling of the balls 22 and 24 against the rolls 28 and 30, corresponding to the motion component of the movement at right angles to the shaft 32, and partly a rotation about the points 34 and 36, corresponding to the motion component of the movement parallel to the shaft 32.

As these motion components correspond to the movements in Figs. 3 and 4 respectively, and as by both the said movements a pure parallel movement of the parallel guiding device is brought about, this will also be the case by the arbitrarily selected moving direction according to Fig. 5.

In Figs. 1 to 5 the balls 22 and 24 are located at the same side of the shaft 32, but it is perfectly in order to place them on either side of the said shaft as indicated in Fig. 3, where the ball 24 may be replaced by the ball 24' shown in dotted lines.

It should also be said that the movement transmitting device 28, 30, 32 between the balls 22 and 24, consists of two equally great rolls on a common shaft, due to the fact that this is the simplest way in which it is possible to ensure that the balls rotate with the same periphery speed which is necessary.

Figs. 6 and 7 illustrate schematically the simplest possible manner of construction of the invention, seeing that in this manner of construction the two rolls 28 and 30 are replaced by a single roll 44 inserted between the rolls 22 and 24 so that it abuts against both these rolls, and that its axis of rotation intersects the central line between the centers of the balls 22 and 24 but in such a manner that it forms an angle to the same. In this manner the two circular rings 34' and 36' with which the roll 44 contacts the two balls 22 and 24 will be located closely together, however, at a small relative distance which is necessary in order to prevent a rotation of the parallel guiding device about the centre of one of the balls.

It should be observed, however, that this simple manner of construction has probably no greater practical importance.

Moreover it should be mentioned that while the above mentioned manners of construction are provided with rolls 28, 30 and 44, this has been done because such rolls will ordinarily be used in practice.

What is theoretically necessary is, however, only that a circular ring is used abutting against each of the balls and in such a manner that its plane is identical with a central plane of the ball and that its centre is located at the ball radius distance from the plane 26.

In practice it will generally be attempted, instead of a single movement transmitting system 28, 30, 32, to interconnect the two balls by means of two relatively independent movement transmitting systems in which manner the frictional forces can be better exploited. Moreover it will ordinarily be most advantageous to use three or more balls so that the parallel guiding device can rest securely against a plane base.

Such an embodiment of the invention is illustrated in Figs. 8 and 9. In these figures 46 indicates a drawing polygon on the surface of which by means of supports 48 three bowl bearings 50, 52 and 54 for three balls 122, 123 and 124 are secured, the centres of which are located in the corners of a rectangular triangle. In the bowl bearings 50, 52 and 54 there are small recesses for receiving small balls 56 disposed freely in individual recesses and abutting against balls 122, 123 and 124 so that the friction between each ball 122, 123 and 124 and its individual bowl bearing will become as small as possible.

When the balls 122, 123 and 124 abut against the small balls 56 in the bowl bearings 50, 52 and 54 the lower parts of the large balls extend through not further illustrated openings in the drawing polygon 46, which openings have a diameter which is smaller than the diameter of the large balls and down under the lower side of the drawing polygon in such a manner that the large balls can abut against the plane 26 at the same time as the drawing polygon 46 is kept raised a little above the same.

The balls 122, 123 and 124 form two sets of balls, 122, 123 and 123, 124 respectively, each set consisting of two balls 122 and 123 and 123 and 124 respectively connected by means of the movement transmitting mechanism. The balls 122 and 123 of the ball set 122, 123 are interconnected by means of two movement transmitting mechanisms. The former consists of two equally great rolls 128 and 130 fastened on a common shaft 132, the axis of which lies in the same plane as the centres of the balls 122, 123 and 124, and the said shaft 132 is rotatably journaled in bearings 58 which are secured to the upper side of the drawing polygon 46.

The second movement transmitting mechanism consists in like manner of two equally great rolls 228 and 230 abutting against the balls 122 and 123, which rolls are fastened on a common shaft 232, the axis of which lies in the same plane as the centres of the balls 122, 123 and 124, and which is rotatably journaled in the bearings 58 on the upper side of the drawing polygon 46.

The two balls of the ball set 123, 124 are interconnected by means of two movement transmitting mechanisms of which one is constituted by the aforesaid roll 230 inserted between the balls 123 and 124 and abuts against both of same, whereas the second movement transmitting mechanism is constituted by two equally great rolls 328 and 330 mounted on a common shaft 332, which is rotatably mounted in bearings 58 on the drawing polygon with its axis located in the plane containing the centers of the balls 122, 123, and 124.

As mentioned above the balls 122 to 124 are arranged in such a manner that the centre line of one of the ball sets 122, 123 is at right angles to the centre line of the second ball set 123, 124.

Furthermore the polygon is arranged in such a manner relatively to the parallel guiding device that its two ruler edges 60 and 62, which are at right angles to each other, are parallel to individual shafts 132 and 332.

By means of arrows on the balls 122 and 124 and the rolls 128, 130, 228, 230, 328 and 330 their direction of movement is indicated by a movement of the drawing polygon in the arbitrarily selected direction shown by the arrow 64.

On each of the shafts 132 and 332 is secured an indicator 66 in the form of a disc on the circumference of which there are division lines. Opposite each of these indicator discs 66 there is on the drawing polygon 46 fastened a projection 68 provided with a marking line to facilitate the reading of the positions of the indicator discs 66.

The discs 66 may be rigidly mounted on the shafts 132 and 332 or they may be adjustably arranged on the same.

As the rotation of the shaft 132 is proportional to the component of the movement of the mechanism at right angles to the shaft and consequently to the parallel movement of the edge 60, this movement may be read by means of the indicator arrangement 66, 68 connected to this shaft. The distance between the division lines on the disc 66 on shaft 132 may suitably correspond to a parallel movement of the edge 60 of one millimeter. The aforesaid indicator arrangement 66, 68 thus makes it possible to draw with the edge 60 parallel constantly spaced lines.

What is said above also applies to the indicator arrangement 66, 68 connected to the shaft 332 and to its co-operation with the movement of the edge 62.

On each of the shafts 132 and 332 is furthermore fastened a braking disc, 70 and 72 respectively, which may each be retained by means of a braking block 74 and 76 respectively secured to the drawing polygon 46 by means of leaf springs 78 and 80 respectively.

When for instance the braking disc 72 is retained when the braking block 76 is pressed in against it, the illustrated drawing apparatus can only be moved parallelly to the shaft 332 and consequently parallel to the edge 62, confer Fig. 4. The latter will, therefore, move along a straight line, and this may e. g. be used when drawing lines which are longer than the edge 62 and when projecting points from one picture to another e. g. from vertical to horizontal projection of an object.

What has been stated above with regard to the edge 62 and the braking arrangement 72, 76, also applies to the edge 60 and the braking arrangement 70, 74.

Figs. 10 and 11 show schematically a parallel guiding device which in the same way as the embodiment according to Figs. 8 and 9 has three balls but where the latter are arranged in such a manner relative to each other that their centres are located in the corner points of an equilateral triangle. In a parallel guiding device of this art the balls 222, 223 and 224 are furthermore interconnected in such a manner by means of movement transmitting mechanisms that the device has three sets of interconnected balls, viz. 222, 223; 223, 224 and 224, 222. Each set is interconnected by means of two equally great rolls 428 and 430 abutting against individual balls and fastened on a common shaft 432. In this manner it is also ensured that each ball is guided by two mechanisms since all the three balls are individually in engagement with a roll 428 and with a roll 430 forming part of individual movement transmitting mechanisms.

Figs. 12 and 13 show a similar embodiment of the invention in which, however, the balls are furthermore movably interconnected by means of a fourth ball 82 which is slightly smaller than the balls 222, 223 and 224 and which contacts the latter in points lying in the same plane as the centres of the balls and consequently has its own centre located in this plane. The ball may, however, as appears from the embodiment according to Figs. 14 and 15, also be located outside the said plane.

In this last said embodiment the drawing polygon 146 is constructed with three openings 84 the centres of which are located in the corners of an equilateral triangle. In each of these openings there is a ball 522, 523 and 524 respectively, said balls being equally big and having a diameter which is greater than the diameter of the openings 84 so that the balls cannot fall through the openings but still have their lowermost portion extending down through the openings so as to be able to abut against the plane 26.

The balls 522, 523 and 524 are kept free from the edges of the openings 84 and with their centres at a quite definite height above the upper side of the drawing polygon in such a manner and such a way as will appear from the following description.

The balls 522, 523 and 524 are movably interconnected in pairs by means of three movement transmitting mechanisms consisting of two rolls 528 and 530 abutting each against one of the two balls, the said rolls being equally great and located on a common shaft 532 mounted in bearings 558 fastened to the upper side of the drawing polygon. Thus the balls 522, 523 and 524 are placed and interconnected in the same manner as shown in Figs. 10 and 11.

On top of the three balls 522, 523 and 524 is resting a ball 586 which is mounted and guided in a bowl bearing 550 between the innerside of which and the ball 586 small balls 556 are inserted freely rotatable in corresponding recesses in the ball bowl. To the upper side of the ball bowl is centrally arranged a screw 588 screwed through a threaded hole in a supporting plate 590. The latter is fitted into a three-legged support 592 which is fastened on the upper side of the drawing polygon. On the free end of the screw 588 is fastened an adjusting wheel 594 by means of which the screw can be turned in which manner the ball bowl can be moved in against and away from the polygon. The ball bowl is retained in its adjusted position by means of a counter-nut 596.

When the drawing polygon with the aforesaid parts is arranged on the plane 26, the balls 522, 523 and 524 will be pressed upwards until each of the balls abuts against a roll 528, a roll 530 and the ball 586 in which manner the position of the ball is exactly fixed. The exact position of the balls is determined by the height of the ball bowl 550 above the drawing polygon which height is adjusted in such a manner that the centers of the balls 522, 523 and 524 will lie in the same plane as the axes of the shafts 532. In practice this position is found comparatively easily as this is the position yielding the slightest opposition against a movement of the drawing polygon across the plane 26.

By this manner of construction it is ensured that when the drawing polygon is used the balls 522, 523 and 524 will on account of the pressure normally exerted against the drawing polygon be pressed directly against the rolls 528 and 530 and against the ball 586 in which manner a suitable friction between these parts can be ensured in a simple way without hampering the movability of the parts.

Also in Figs. 10 to 15 arrows indicate the various ball paths and the directions of the rolling movement when the parallel guiding device is moved in the arbitrary direction indicated by the arrow 98.

Figs. 16 and 17 illustrate a practical embodiment of a drawing machine with a parallel guiding device according to the invention. In a frame 610 there is built in six ball bearings 658 for three cylindrical rolls 632 arranged in such a manner that their axes form part of individual sides of an equilateral triangle. The rolls 632 can freely rotate in these bearings 658 but are by means of resilient rings 612 prevented from being displaced in the longitudinal direction. By means of screws furthermore three covers 650 are fastened to the frame 610 which in conjunction with oppositely positioned recesses 651 in the frame 610 form three ball bowls in each of which a ball 614 rotatable in any direction is placed. Between the latter and the ball bowl 650, 651 a great number of small balls 656 have been inserted exactly filling the space between the ball 614 and the ball bowl. The ball bowls are open at one side so that the three balls 614 can abut individually against one of the three balls 622, 623 and 624 in the points 616. The balls 622, 623 and 624 are furthermore arranged in such a manner that each of the balls abuts against one end of two of the rolls 632. The balls are thus securely guided in a kind of three point suspension.

The frame 610 is secured to the upper side of a drawing polygon 646 in which is formed a central opening 618 through which the lowermost ends of the balls 622, 623 and 624 may extend so that the drawing polygon 646 is carried by the balls at a small distance from the drawing plane on which the drafting machine is placed.

The drawing polygon 646 is preferably made from a transparent material and is shown provided with measuring division lines along two edges 660 and 662 at right angles to each other, a 90° circular arc with graduations for the adjustment of the drafting machine in different angular positions, and an edge 665 having the form of part of a polygon. The latter may preferably be performed in such a manner that it has edge portions forming different angles, e. g. 30, 45 and 60° to the edges 660 and 662 so that by moving one of these edge portions against a fixed straight-lined abutment on the drawing plane it is possible to adjust the drawing apparatus in different fixed angles.

A bowl shaped handle 620 serving to move the drawing apparatus is freely movably mounted in a ball bearing 602 in the frame 610 and is secured to the same by means of a resilient ring 604. The handle 620 is constructed with a central hole 606 in which there is displaceably mounted a pin 608 which at the bottom is provided with a braking head 674 and at the top with an operation button 675. A spring 678 abutting against the underside of the latter will try to keep the pin 608 in its uppermost position.

It will easily be seen that the balls 622, 623 and 624 and the rolls 632 will constitute a parallel guiding device of the type shown in Figs. 10 and 11. When the drafting machine rests on a plane or is pressed gently against the same the balls 614 will press the balls 622, 623 and 624 out against the rolls 632 and thus secure a good friction between the same and the last mentioned balls.

When moving the machine the balls 622, 623 and 624, the surface of which must have a suitable friction, will move the balls 614 which again has the result that the small balls 656 will roll in the ball bowls 650, 651. In this manner it is obtained that the rolls 622, 623 and 624 are practically not exposed to any friction from the connection with the frame 610.

When pressing down the operating button 675 the braking block 674 which is mounted above the opening 618 in the drawing polygon 646 is pressed down against the drawing plane so that the drafting machine can be kept immovable when drawing the lines.

The drafting machine shown in Figs. 16 and 17 can be considered an arbitrary embodiment of a plurality of embodiments of a drafting machine or other device with a parallel guiding device according to the invention and it will be understood that various changes in the details and arrangements of the parts which have been herein described and illustrated in order to explain the nature of the invention, may be made within the principle and scope of the invention as expressed in the appended claims.

I claim:

1. A parallel guiding device for ensuring parallel motion in all directions of an article or device on a plane surface, comprising in combination, a support connectable to or constituting part of said article or device, at least two balls freely rotatably mounted in said support and intended to abut said surface, and at least one movement transmitting mechanism in said support connecting said two balls and including two circular rings rotatably mounted in said support in parallel planes, said two rings engaging one of said two balls each and each having its center situated in a center plane of one of said two balls, which it engages, and at a distance from said surface equal to the radius of the last mentioned ball, and means connecting said two rings and adapted to cause said two rings when rotated, to rotate with the same peripherical speed.

2. A parallel guiding device as stated in claim 1, at least one of said two rings being constituted by a part of a cylindrical member rotatably mounted in said support.

3. A parallel guiding device as stated in claim 1, said two rings having the same outer diameter and being disposed on a common shaft rotatably mounted in said support.

4. A parallel guiding device as stated in claim 1, said two balls having the same diameter.

5. A parallel guiding device as stated in claim 1, said two balls having the same diameter, a further movement transmitting mechanism being inserted between said two balls, said last-named mechanism comprising a member rotatably mounted in said support and having a ring-like portion engaging both the said balls, said ring-like portion being situated in a plane which passes through the centers of said two balls and having its own center situated on the line connecting the centers of said two balls.

6. A parallel guiding device for ensuring parallel motion in all directions of an article or device on a plane surface, comprising in combination a support connectable to or constituting part of said article or device, at least three balls freely rotatably mounted in said support and intended to abut against said surface, said three balls being situated in the corners of a triangle, at least two movement transmitting mechanisms in said support connecting one of said balls with one of the two other of said balls each, each of said two movement transmitting mechanisms including two circular rings rotatably mounted in said support in parallel planes, each of said two rings engaging one of said two balls interconnected by the movement transmitting mechanism in question, and each having its center situated in a centerplane of the said ball engaged thereby, and means connecting said two rings and adapted to cause said two rings, when rotated, to rotate with the same peripherical speed.

7. A parallel guiding device as stated in claim 6, said three balls being situated in the corners of a rectangular triangle.

8. A parallel guiding device as stated in claim 6, said three balls being situated in the corners of an equilateral triangle.

9. A parallel guiding device for ensuring parallel motion in all directions of an article or device on a plane surface, comprising in combination, a support connectable to or constituting part of said article or device, three balls freely rotatably mounted in said support and intended to abut said surface, said three balls being situated in the corners of a triangle and all three balls having the same diameter, at least two movement transmitting mechanisms in said support connecting one of said balls with one of the two others of said balls each, each of said movement transmitting mechanisms including two rolls having the same outer diameter and each engaging one of said two balls interconnected by the movement transmitting member in question, said two rolls being disposed on a common shaft rotatably mounted in said support with its center line situated at a distance from said surface equal to the radius of said balls.

10. A parallel guiding device as stated in claim 9, a supporting ball rotatably mounted in said support and engaging all of the first mentioned three balls.

11. A parallel guiding device for ensuring parallel motion in all directions of an article or device on a plane surface, comprising in combination, a support connectable to or constituting part of said article or device, at least two balls freely rotatably mounted in said support and adapted to abut said surface, at least two rolls having the same outer diameter and engaging with their peripherical surfaces one of said two balls each, said two rolls being disposed on a common shaft rotatably mounted in said support with its center line situated in the intersecting line between a plane rectangular to said plane surface and situated at a distance from said two balls equal to the radius of said rolls and a plane through the centers of said two balls and rectangular to said first plane.

12. A parallel guiding device as stated in claim 11, a brake pulley on said shaft and a brake block movably connected to said support and adapted to be brought into engagement with said brake pulley when a rotation of said shaft has to be prevented.

13. A parallel guiding device as stated in claim 11, an indicator device connected to said shaft and a further indicator device for cooperating with the first mentioned indicator device connected to said support.

14. A parallel guiding device for ensuring parallel motion in all directions of an article or device on a plane surface, comprising in combination, a support connectable to or constituting part of said article or device, at least three balls rotatably mounted in said support and adapted to abut said surface, said balls being situated in the corners of a triangle, at least three movement transmitting mechanisms connecting said balls two and two and each comprising two rolls having the same diameter and engaging with their peripherical surfaces one each of the two balls of said three balls which are connected by the movement transmitting mechanism in question, said two rolls being disposed on a common shaft rotatably mounted in said support with its center line situated in the intersecting line between a plane rectangular to said plane surface and situated at a distance from said last mentioned two balls equal to the radius of said rolls and a plane through the centers of said last mentioned two balls and rectangular to said first named plane.

15. A parallel guiding device as stated in claim 14, said support being for each of said three balls provided with a bearing shell, a guide ball inserted in each said shell, each of said three balls being supported and kept in place by abutting one of said guide balls and two of said rolls, each of the latter belonging to one of said three movement transmitting mechanisms connecting a ball of said three balls with the other balls.

16. A parallel guiding device as stated in claim 14, said support being for each of said three balls provided with a bearing shell, a guide ball inserted in each said shell, a number of bearing balls inserted between each said guide ball and the inner side of said shells, each of the first mentioned three balls being supported and kept in place by abutting one of said guide balls and two of said rolls belonging to two of said three movement transmitting mechanisms each connecting a ball of said three balls with the other two of the three balls.

17. A parallel guiding device as stated in claim 14, a guide ball rotatably mounted in said support and engaging all of the first said three balls.

18. A parallel guiding device as stated in claim 14, a guide ball rotatably mounted in said support and engaging all of the first mentioned three balls above the center plane thereof, and means connected to said support for adjustably pressing said guide ball in direction of the first mentioned three balls.

19. A parallel guiding device as stated in claim 14, a brake member movably connected to said support and adapted to be pushed into engagement with the said plane surface.

20. A drafting machine comprising in combination, a ruler member, a support connected to said ruler member, at least three balls freely rotatably mounted in said support and projecting below the underside of said ruler member, at least one movement transmitting mechanism connecting two of said three balls and comprising two rolls having the same diameter and engaging one of the last mentioned two balls each, said rolls being disposed on a common shaft rotatably mounted in said support with its center line situated in the intersecting line between a plane perpendicular to the common tangential-plane to the lower portions of said three balls and situated at a distance from said last mentioned two balls equal to the radius of said rolls and a plane through the centers of the said last mentioned two balls and rectangular to said first named plane.

21. A drafting machine as stated in claim 20, a handle rotatably mounted on said support.

22. A drafting machine as stated in claim 20, said ruler member being provided with at least one long linear ruler edge and further with at least one polygonal edge having parts forming different angles to said linear ruler edge.

References Cited in the file of this patent

UNITED STATES PATENTS

| 723,039 | Schmitt | Mar. 17, 1903 |
| 1,111,174 | Ostringer | Sept. 22, 1914 |
| 1,503,824 | Fry | Aug. 5, 1924 |

FOREIGN PATENTS

| 164,191 | Austria | Oct. 10, 1949 |